(12) United States Patent
Draper

(10) Patent No.: US 10,233,908 B2
(45) Date of Patent: Mar. 19, 2019

(54) SYSTEM AND METHOD FOR DE-ICING A WIND TURBINE ROTOR BLADE

(71) Applicant: General Electric Company, Schenectady, NY (US)

(72) Inventor: Samuel David Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 15/012,962

(22) Filed: Feb. 2, 2016

(65) Prior Publication Data

US 2017/0218926 A1    Aug. 3, 2017

(51) Int. Cl.
| | |
|---|---|
| *F03D 80/40* | (2016.01) |
| *F03D 7/02* | (2006.01) |
| *F03D 1/06* | (2006.01) |
| *F03D 17/00* | (2016.01) |
| *F03D 13/20* | (2016.01) |

(52) U.S. Cl.
CPC ........... *F03D 80/40* (2016.05); *F03D 1/0666* (2013.01); *F03D 7/0212* (2013.01); *F03D 7/0224* (2013.01); *F03D 7/0276* (2013.01); *F03D 13/20* (2016.05); *F03D 17/00* (2016.05)

(58) Field of Classification Search
CPC ........ F03D 1/06; F03D 1/0666; F03D 7/0212; F03D 7/0224; F03D 7/0276; F03D 7/0208; F03D 7/0264; F03D 9/11; F03D 9/25; F03D 9/32; F03D 11/005; F03D 13/20; F03D 17/00; F03D 80/40; F03D 80/60
See application file for complete search history.

(56) References Cited

U.S. PATENT DOCUMENTS 7,182,575 B2 * 2/2007 Grabau ................ F03D 7/0224
416/1
7,922,449 B2   4/2011 Scholte-Wassink
(Continued)

FOREIGN PATENT DOCUMENTS

| EP | 2 725 224 A1 | 4/2014 | |
|---|---|---|---|
| KR | 20130025700 A * | 3/2013 | ............. F03D 80/40 |
| WO | 2009/157839 A1 | 12/2009 | |

OTHER PUBLICATIONS

Machine translation of KR 2013-0025700; retrived from ESAPCENET on Dec. 27, 2017.*

(Continued)

*Primary Examiner* — David E Sosnowski
*Assistant Examiner* — Sang K Kim
(74) *Attorney, Agent, or Firm* — Dority & Manning, P.A.

(57) ABSTRACT

The present disclosure is directed to systems and methods for de-icing a rotor blade of a wind turbine. The wind turbine has a nacelle mounted atop a tower. The nacelle has a rotor with a rotatable hub having rotor blade mounted thereto. The method includes shutting down the wind turbine in response to detecting ice on the rotor blade. The method also includes positioning the wind turbine in a de-icing position, the de-icing position including at least one of yawing the nacelle of the wind turbine such that the rotor is in a down-wind location of the tower or pitching the rotor blade such that a leading edge of the rotor blade is facing the tower. Another step includes de-icing the rotor blade while the rotor is in the de-icing position.

14 Claims, 5 Drawing Sheets

(56) References Cited

U.S. PATENT DOCUMENTS

| | | | |
|---|---|---|---|
| 8,292,579 B2 | 10/2012 | Magnuson | |
| 2008/0317583 A1* | 12/2008 | Grabau | F03D 1/00 |
| | | | 415/4.3 |
| 2010/0135787 A1* | 6/2010 | Scholte-Wassink | ......................... |
| | | | F03D 7/0212 |
| | | | 416/1 |
| 2013/0161955 A1* | 6/2013 | Dalsgaard | F03D 7/0224 |
| | | | 290/44 |

OTHER PUBLICATIONS

Extended European Search Report and Opinion issued in connection with corresponding EP Application No. 17154368.9 dated Jun. 27, 2017.

\* cited by examiner

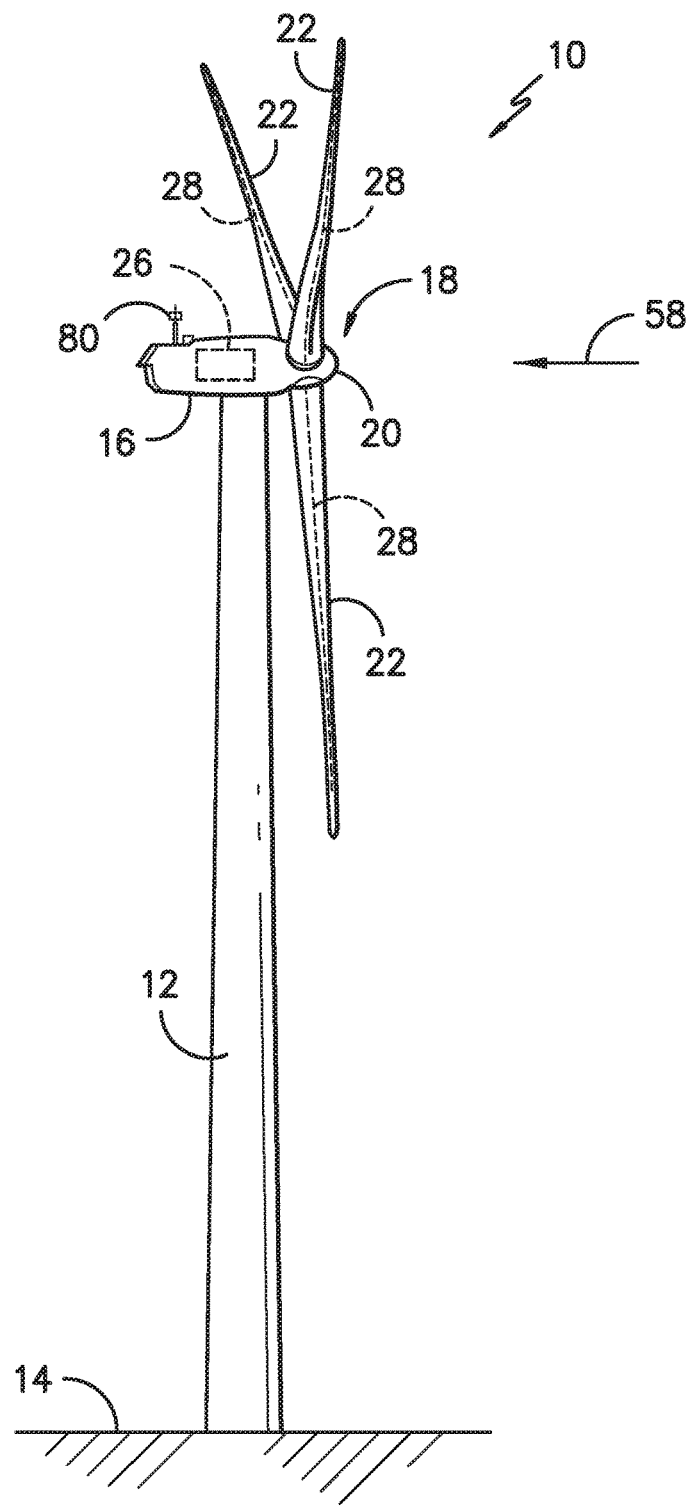
FIG. -1-

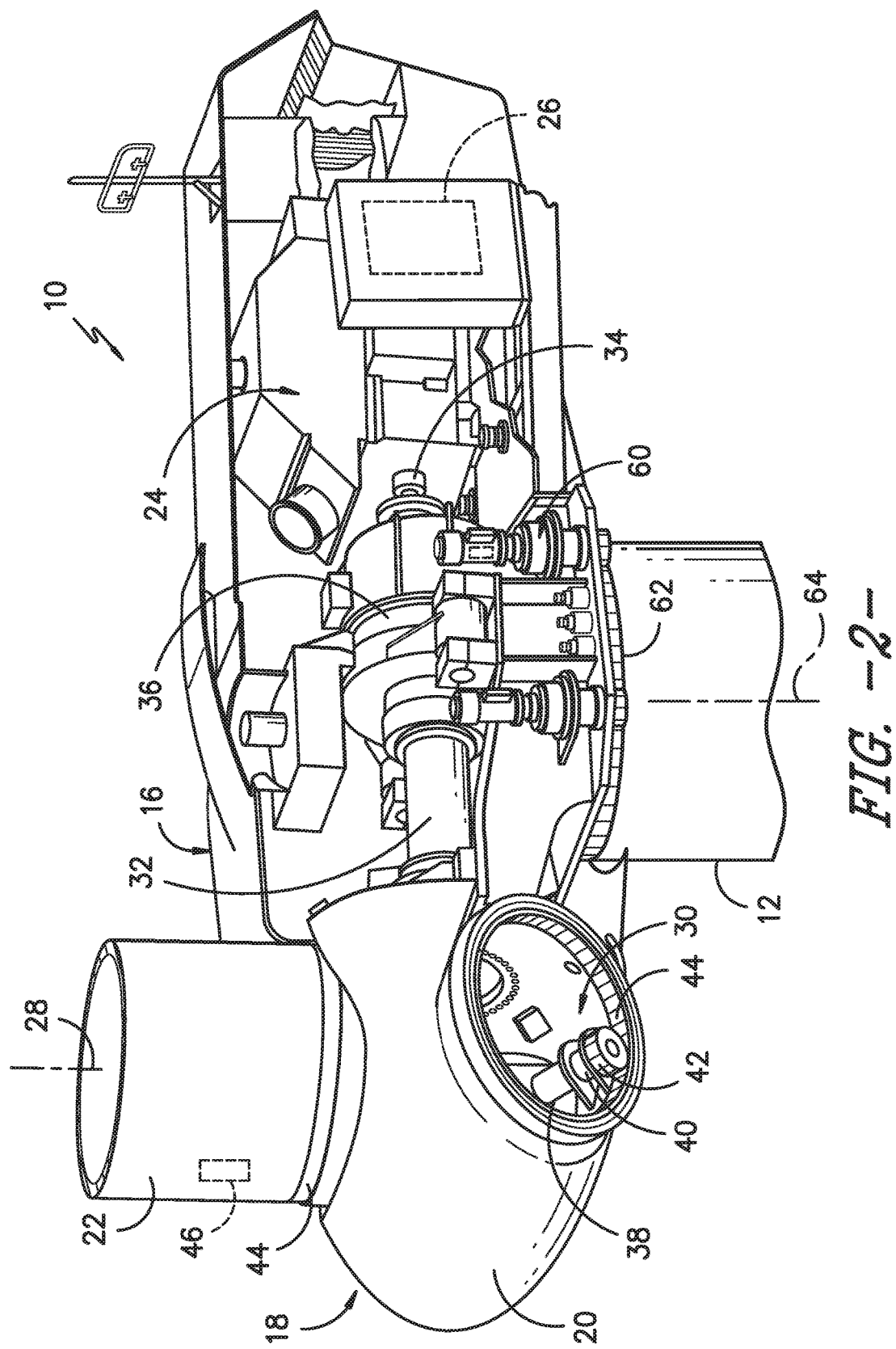
FIG. -2-

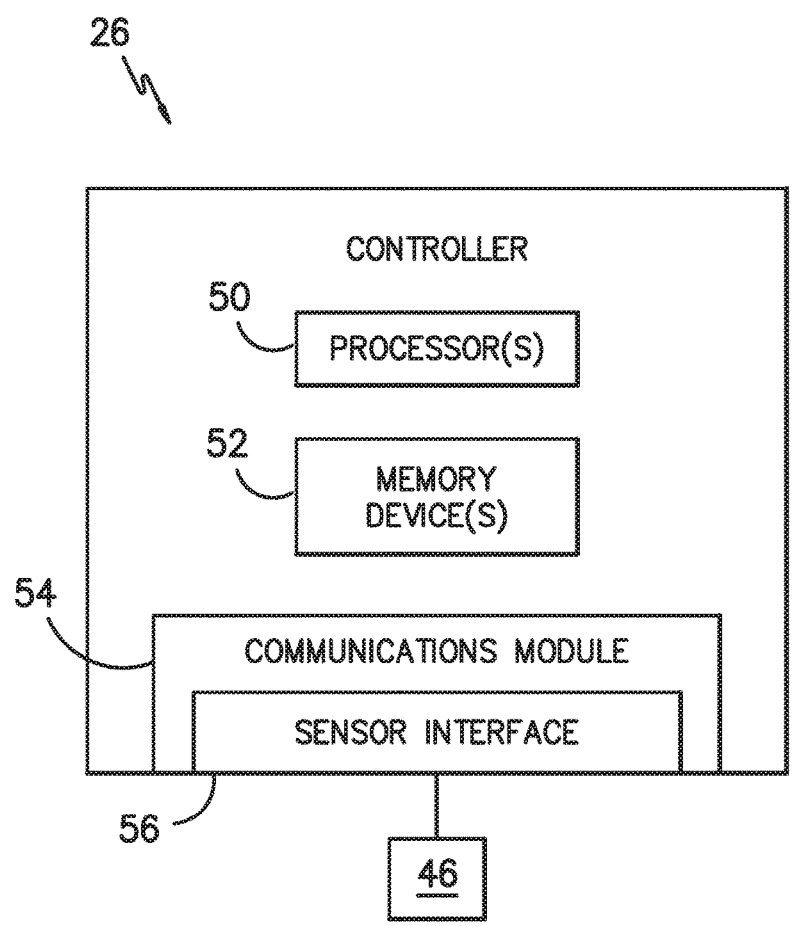
FIG. -3-

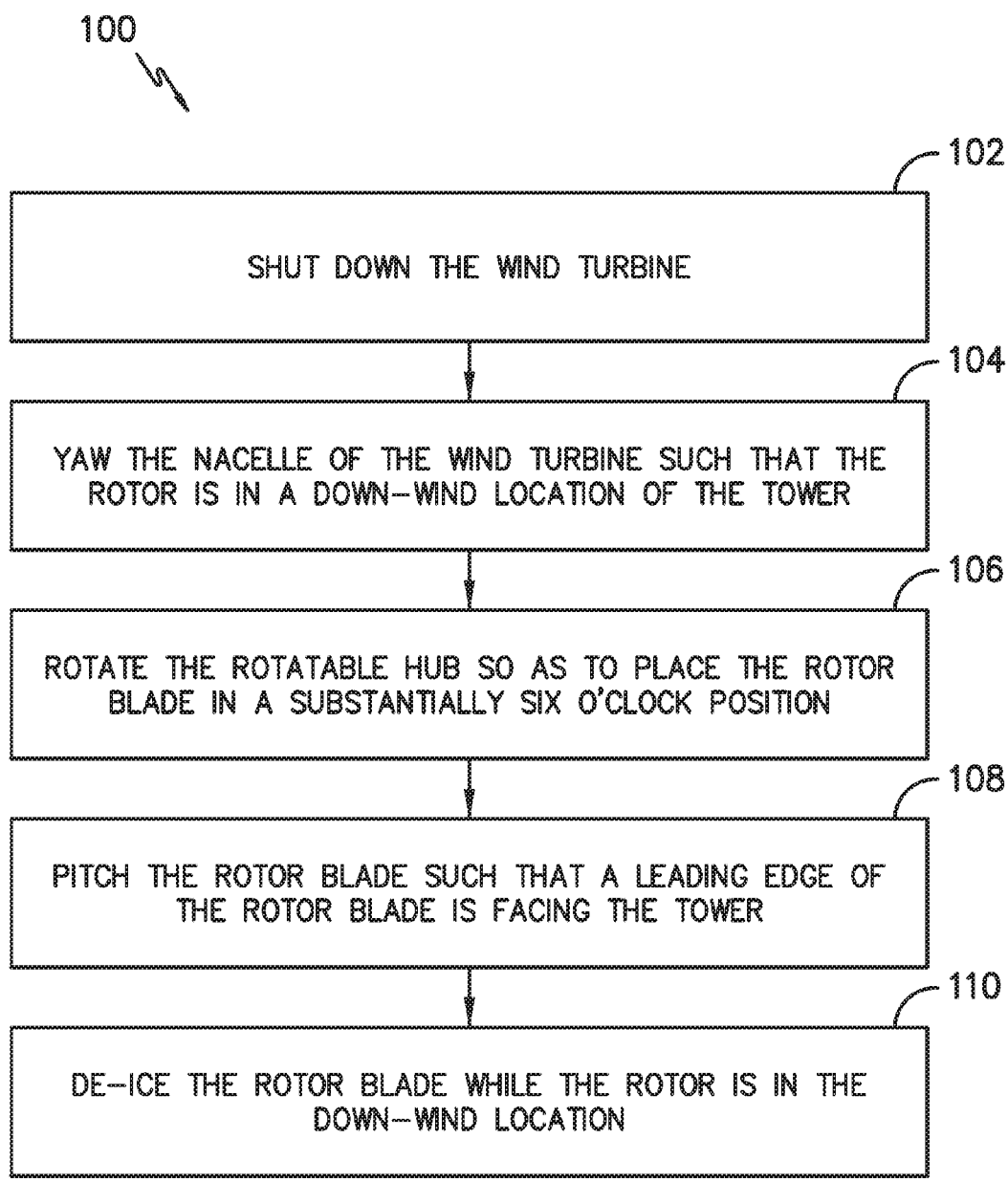
FIG. -4-

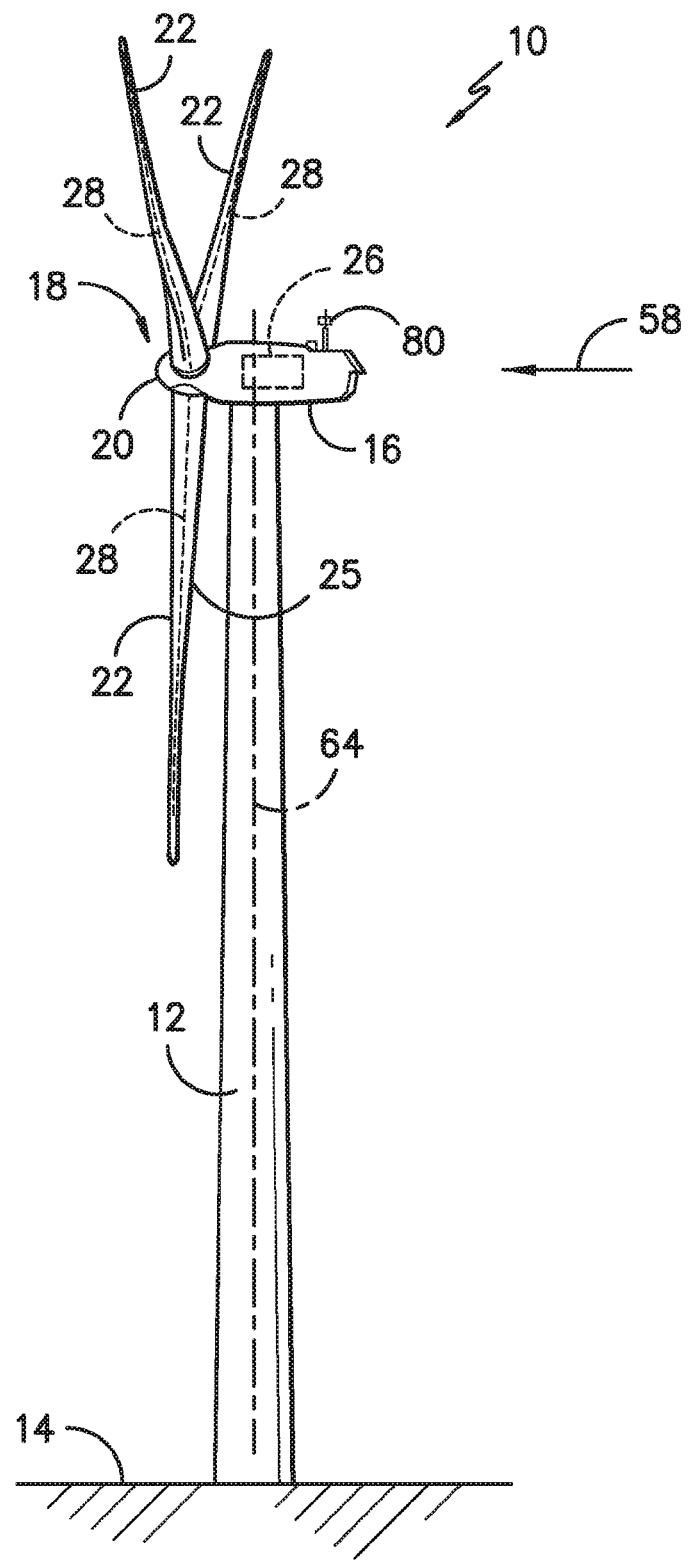
FIG. -5-

SYSTEM AND METHOD FOR DE-ICING A WIND TURBINE ROTOR BLADE

FIELD OF THE INVENTION

The present disclosures relates generally to wind turbines and, more particularly, to systems and methods for de-icing wind turbine rotor blades.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

Under some atmospheric conditions, ice may be buildup or otherwise accumulate on the rotor blades of a wind turbine. As the ice layer accumulating on a rotor blade becomes increasingly thicker, the aerodynamic surface of the blade is modified, thereby resulting in diminished aerodynamic performance. Moreover, ice accumulation significantly increases the weight of a rotor blade, which can lead to structural damage as an increased amount of bending moments and/or other rotational forces act on the rotor blade. In addition, when there is a differential in the amount of ice accumulating on each of the rotor blades, a mass imbalance may occur that can cause significant damage to a wind turbine.

Due to the disadvantages associated with ice accumulation, a wind turbine may be shutdown when it is believed that ice has accumulated on the surface of one or more of the rotor blades. Operation of the wind turbine may then be restarted after it can be verified that ice is no longer present on the rotor blades.

Conventional systems for de-icing rotor blades involve clearing all of the blades for ice at the same time. For example, such conventional systems may include large heating systems configured to circulate hot air across the surface of the blades. Such systems, however, require significant energy due to the high heat transfer losses to the atmosphere during blade heating.

Accordingly, the art is continuously seeking new and improved systems and methods for de-icing rotor blades having reduced heat transfer losses.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for a method for de-icing a rotor blade of a wind turbine. The wind turbine has a nacelle mounted atop a tower. The nacelle has a rotor with a rotatable hub having the rotor blade mounted thereto. The method includes shutting down the wind turbine, e.g. in response to detecting ice on the rotor blade. The method also includes positioning the wind turbine in a de-icing position, the de-icing position including at least one of yawing the nacelle of the wind turbine such that the rotor is in a down-wind location of the tower, i.e. in the wake of the wind turbine, or pitching the rotor blade such that a leading edge of the rotor blade is facing the tower. Another step includes de-icing the rotor blade while the rotor is in the de-icing position.

In one embodiment, the step of positioning the wind turbine in the de-icing position may include both yawing the nacelle of the wind turbine such that the rotor is in the down-wind location of the tower and pitching the rotor blade such that a leading edge of the rotor blade is facing the tower. In another embodiment, the method may include rotating the rotatable hub so as to place the rotor blade in a substantially six o'clock position, e.g. before or after yawing the nacelle.

In further embodiments, the step of pitching the rotor blade such that a leading edge of the rotor blade is facing the tower may be completed before or after rotating to blade to the six o'clock position and with or without yawing the nacelle. In certain embodiments, the step of pitching the rotor blade may occur after yawing the nacelle. Alternatively, the step of pitching the rotor blade may occur before yawing the nacelle. Thus, positioning the wind turbine in the de-icing position, e.g. by yawing the nacelle and pitching the rotor blade so that the leading edge faces the tower, places the blade in a low-velocity environment, minimizing the heat loss to the atmosphere and maximizing the effectiveness of blade de-icing.

In additional embodiments, the method may include continuously yawing the nacelle of the wind turbine such that the nacelle remains facing away from the wind. Further, the step of yawing the nacelle of the wind turbine may include rotating the nacelle about a yaw axis approximately 180 degrees from an initial location facing the wind.

In further embodiments, the step of de-icing the rotor blade may include any suitable de-icing methods. For example, in certain embodiments, the blade may be de-iced by circulating or blowing heated air within or across the rotor blade. In another embodiment, the rotor blade may be heated via one or more electric heating elements within or on a surface of the rotor blade. In still a further embodiment, the blade may be de-iced by spraying a de-icing liquid (e.g. anti-freeze) across the rotor blade.

In further embodiments, the method may include monitoring, via one or more sensors, an ice-related parameter of rotor blade that is indicative of ice being present on the rotor blade. Thus, in additional embodiments, the method may include shutting down the wind turbine in response to the ice-related parameter indicating the presence of ice on the rotor blade.

In another aspect, the present disclosure is directed to a system for de-icing a rotor blade of a wind turbine. The wind turbine has a nacelle mounted atop a tower. The nacelle has a rotor with a rotatable hub having the rotor blade mounted thereto. The system includes one or more sensors configured to monitor an ice-related parameter of the wind turbine, a yaw drive mechanism, and a controller communicatively coupled to the sensor(s) and the yaw drive mechanism. Thus, the controller is further configured to receive signals from the sensor(s) related to the ice-related parameter and implement a de-icing procedure in the event that the ice-related parameter indicates the presence of ice on the rotor blade. More specifically, the de-icing procedure includes shutting down the wind turbine, yawing, via the yaw drive mechanism, the nacelle of the wind turbine such that the rotor is in a down-wind location of the tower, and de-icing the rotor blade while the rotor is in the down-wind location.

In yet another aspect, the present disclosure is directed to a method for de-icing a rotor blade of a wind turbine. The wind turbine has a nacelle mounted atop a tower. The nacelle has a rotor with a rotatable hub having the rotor blade mounted thereto. The method includes (a) shutting down the wind turbine, e.g. in response to ice detection, (b) yawing the nacelle of the wind turbine such that the rotor is in a down-wind location of the tower, (c) rotating the rotatable hub so as to place one of the rotor blades in a six o'clock position, and (d) de-icing the rotor blade while the rotor is in the down-wind location and the rotor blade is in the six o'clock position. Thus, the method may also include repeating steps (b) through (d) for each of the rotor blades as needed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure, particularly illustrating the wind turbine in a wind-facing position;

FIG. 2 illustrates a simplified, internal view of one embodiment of a nacelle of a wind turbine;

FIG. 3 illustrates a schematic diagram of one embodiment of suitable components that may be included within a turbine controller of a wind turbine;

FIG. 4 illustrates a flow diagram of one embodiment of a method for de-icing a rotor blade of a wind turbine; and FIG. 5 illustrates a perspective view of one embodiment of a wind turbine according to the present disclosure, particularly illustrating the wind turbine in a down-wind position.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for de-icing a wind turbine rotor blade. Specifically, the disclosed system and method provide a means for de-icing a rotor blade in a down-wind location behind the wind turbine tower. For example, in several embodiments, upon shutdown of a wind turbine, the nacelle may be positioned in a de-icing position. For example, in one embodiment, the de-icing position may include yawing the nacelle such that one of the rotor blades is in a down-wind location (i.e. in a wake region) behind the tower, pitching the rotor blade such that a leading edge of the rotor blade is facing the tower, or both. The hub may also be rotated so as to place the rotor blade in a substantially six o'clock position. The rotor blade can then be de-iced while the rotor in the de-icing position, e.g. by blowing hot air within or across the rotor blade. Accordingly, by placing the rotor blade in a low-velocity environment, the heat transfer loss is minimized so as to maximize the effectiveness of blade de-icing.

The present disclosure provides many advantages not present in the prior art. For example, by de-icing each rotor blade one at a time, each blade can be located in a down-wind or wake region during de-icing which improves de-icing efficiency. Thus, the method of the present disclosure reduces complexity and costs associated with de-icing each of the rotor blades.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 30 (FIG. 2) of the wind turbine 10. During operation of the wind turbine 10, the controller 26 may generally control each pitch adjust mechanism 30 in order to alter the pitch angle of each rotor blade 22 between 0 degrees (i.e., a power position of the rotor blade 22) and 90 degrees (i.e., a feathered position of the rotor blade 22). In addition, the turbine controller 26 may control the orientation of the nacelle 16 with respect to the wind direction 58 by transmitting suitable control signals to one or more yaw drive mechanisms 60 that engage a yaw bearing 62 (FIG. 2). Thus, rotation of the yaw bearing 62 changes the orientation of the nacelle 16.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 30 of the wind turbine 10 (one of which is shown) to facilitate rotation of each rotor blade 22 about its pitch axis 28.

In general, each pitch adjustment mechanism 30 may include any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28.

In alternative embodiments, it should be appreciated that each pitch adjustment mechanism 30 may have any other suitable configuration that facilitates rotation of a rotor blade 22 about its pitch axis 28. For instance, pitch adjustment mechanisms 30 are known that include a hydraulic or pneumatic driven device (e.g., a hydraulic or pneumatic cylinder) configured to transmit rotational energy to the pitch bearing 44, thereby causing the rotor blade 22 to rotate about its pitch axis 28. Thus, in several embodiments, instead of the electric pitch drive motor 38 described above, each pitch adjustment mechanism 30 may include a hydraulic or pneumatic driven device that utilizes fluid pressure to apply torque to the pitch bearing 44.

Referring still to FIG. 2, the wind turbine may also include a plurality of sensors (e.g. such as sensor 46) for monitoring one or more ice-related parameters and/or conditions of the wind turbine 10. As used herein, a parameter or condition of the wind turbine 10 is "monitored" when a sensor is used to determine its present value. Thus, the term "monitor" and variations thereof are used to indicate that the sensors 46 need not provide a direct measurement of the parameter and/or condition being monitored. For example, the sensors 46 may be used to generate signals relating to the parameter and/or condition being monitored, which can then be utilized by the turbine controller 26 or other suitable device to determine the actual parameter and/or condition.

It should be appreciated that the wind turbine 10 may also include various other sensors for monitoring any other suitable parameters and/or conditions of the wind turbine 10. For example, the wind turbine 10 may include sensors for monitoring the pitch angle of each rotor blade 22, any bending moments on the rotor blades 22, the speed of the rotor 18 and/or the rotor shaft 32, the speed of the generator 24 and/or the generator shaft 34, the torque on the rotor shaft 32 and/or the generator shaft 34, the wind speed and/or wind direction and/or any other suitable parameters and/or conditions. Such parameters may also be used in determining ice-related parameters of the rotor blades 22.

Referring now to FIG. 3, there is illustrated a block diagram of one embodiment of suitable components that may be included within the turbine controller 26 in accordance with aspects of the present disclosure. As shown, the turbine controller 26 may include one or more processor(s) 50 and associated memory device(s) 52 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 52 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 52 may generally be configured to store suitable computer-readable instructions that, when implemented by the processor(s) 50, configure the turbine controller 26 to perform various functions including, but not limited to, transmitting suitable control signals to one or more of the pitch adjustment mechanisms 30, monitoring various parameters and/or conditions of the wind turbine 10 and various other suitable computer-implemented functions.

Additionally, the turbine controller 26 may also include a communications module 54 to facilitate communications between the controller 26 and the various components of the wind turbine 10. For instance, the communications module 54 may serve as an interface to permit the turbine controller 26 to transmit control signals to each pitch adjustment mechanism 30 for controlling the pitch angle of the rotor blades 22. Moreover, the communications module 54 may include a sensor interface 56 (e.g., one or more analog-to-digital converters) to permit signals transmitted from the sensors 46 of the wind turbine 10 to be converted into signals that can be understood and processed by the processors 50.

It should be appreciated that the sensors 46 may be communicatively coupled to the communications module 54 using any suitable means. For example, as shown in FIG. 3, the sensor 46 may be coupled to the sensor interface 56 via a wired connection. However, in other embodiments, the sensors 46 may be coupled to the sensor interface 56 via a wireless connection, such as by using any suitable wireless communications protocol known in the art.

Referring now to FIG. 4, there is illustrated a flow diagram of one embodiment of a method 100 for de-icing rotor blade of a wind turbine (e.g. the rotor blade 22 of the wind turbine 10 of FIG. 1). In several embodiments, it should be appreciated that the disclosed method 100 may be performed automatically by the turbine controller 26. For example, the turbine controller 26 may be provided with suitable computer-readable instructions that, when implemented, configure the controller 26 to transmit control signals that shut down the wind turbine 10 so as to implement a de-icing procedure. More specifically, in certain embodiments, the method 100 may include monitoring, via one or more of the sensors 46, an ice-related parameter of rotor blade 22 that is indicative of ice being present on rotor blade 22. The sensors 46 are configured to send signals to the controller 26 indicating that ice is present. Thus, in such embodiments, as shown at 102, the method 100 may include shutting down the wind turbine 10 in response to the ice-related parameter indicating the presence of ice on the rotor blade 22.

In response to shutting down the wind turbine 10, the method 100 includes positioning the wind turbine 10 in a de-icing position. For example, as shown at 104, the de-icing position may include yawing the nacelle 16 of the wind turbine 10 such that the rotor 18 is in a down-wind location of the tower 12, i.e. a wake region of the wind turbine 10. For example, as shown in FIG. 5, the step of yawing the nacelle 16 of the wind turbine 10 may include rotating the nacelle 16 about the yaw axis 64 approximately 180 degrees, e.g. from an initial location facing the wind. Further, as shown in FIGS. 1 and 5, the wind direction is represented by arrow 58. Thus, FIG. 1 illustrates the wind turbine 10 facing the wind, whereas FIG. 5 illustrates the wind turbine 10 facing away from the wind, i.e. the nacelle 16 has been yawed to a down-wind location. In additional embodiments, the method 100 may include continuously yawing the nacelle 16 of the wind turbine 10 such that the nacelle 16 remains facing away from the wind. The de-icing procedure can take time to complete. During such time, the wind direction may change. As such, the controller 26 is configured to continuously yaw the nacelle 16 so as to maintain the nacelle 16 in a position that faces away from the wind. In such embodiments, the wind direction can be determined via one or more sensors in received by the controller 26 for appropriate action.

As shown at 106, the de-icing position may also include rotating the rotatable hub 20 so as to place the rotor blade 22 in a substantially six o'clock position (FIG. 5). It should be understood that placing the rotor blade 22 in a substantially six o'clock position can be done either before or after yawing the nacelle 16 in addition to being performed without yawing the nacelle 16.

In additional embodiments, as shown at 108, the de-icing position may also include pitching the rotor blade 22 such that a leading edge 25 of the rotor blade 16 is facing or is adjacent to the tower 12. For example, in certain embodiments, pitching the blade 22 approximately 180 degrees such that the leading edge 25 is facing the tower 12 moves the edge 25 closer to the tower 12, thereby further reducing the heat transfer on the region of the blade most critical for de-icing. In addition, in certain embodiments, the step of pitching the rotor blade 22 may occur after yawing the nacelle 16. In alternative embodiments, the step of pitching the rotor blade 22 may occur before yawing the nacelle 16. Thus, any of the de-icing positions as described herein may be performed in combination with each other in any order or in isolation.

Referring still to FIG. 4, as shown at 110, the method 100 includes de-icing the rotor blade 22 while the rotor 18 is in the down-wind location (FIG. 5) and/or when the rotor blade 22 is in the six o'clock position, i.e. the rotor blade 22 is in a de-icing position. More specifically, in certain embodiments, the step of de-icing the rotor blade 22 may include any suitable de-icing methods. For example, in one embodiment, the rotor blade 22 may be de-iced by circulating or blowing heated air within or across the blade 22. In another embodiment, the rotor blade 22 may be heated via one or more heating elements. In still a further embodiment, the rotor blade 22 may be de-iced by spraying a de-icing liquid (e.g. anti-freeze) within or across the rotor blade 22.

After the rotor blade 22 is de-iced, the rotor 18 can be further rotated to place an adjacent rotor blade 22 in the six o'clock position and the de-icing process for each subsequent rotor blade 22 can be repeated. Once all of the rotor blades 22 have been de-iced, the wind turbine 10 can be restarted, e.g. by the controller 26. In addition, one or more sensors 26 may determine when the blades 22 have been sufficiently de-iced such that normal operation may resume.

As indicated above, it should be appreciated that the present disclosure is also directed to a system for de-icing a wind turbine rotor blade 22. Thus, in several embodiments, the system may generally include one or more sensors (e.g. sensors 46) configured to monitor an ice-related parameter of the wind turbine 10, a pitch adjustment mechanism 30 (FIG. 2) configured to pitch the rotor blade 22 about its pitch axis 28, and/or a yaw drive mechanism 60 configured to yaw the nacelle 16 about its yaw axis 64.

Additionally, the system may include a controller 26 communicatively coupled to the pitch adjustment mechanism 30, the yaw drive mechanism 60, and/or the sensor(s) 46. Thus, as described above, the controller 26 may be configured to receive signals from the one or more sensors 46 related to the ice-related parameter and implement a de-icing procedure in the event that the ice-related parameter indicates the presence of ice on the rotor blade 22. More specifically, the de-icing procedure implemented by the controller 26 may include shutting down the wind turbine 10, yawing, via the yaw drive mechanism, the nacelle 16 of the wind turbine 10 such that the rotor 18 is in a down-wind location of the tower 12, and, de-icing the rotor blade 22 while the rotor 18 is in the down-wind location and the rotor blade 22 is in the six o'clock position. In addition, in certain embodiments, the de-icing procedure may further include pitching, via the pitch adjustment mechanism 30, the rotor blade 22 such that the leading edge 25 of the rotor blade 22 is facing the tower 12. More specifically, as mentioned, the rotor blade(s) 22 may be de-iced using any suitable de-icing methods such as by circulating heated air within or across the blade 22, heating the rotor blade(s) 22 via one or more heating elements, and/or by spraying a de-icing liquid (e.g. anti-freeze) within or across the rotor blade(s) 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for de-icing a rotor blade of a wind turbine, the wind turbine having a nacelle mounted atop a tower, the nacelle having a rotor with a rotatable hub having the rotor blade mounted thereto, the method comprising:
   operating the wind turbine, wherein operation of the wind turbine generates a wake region extending from the tower to a down-wind location of the tower;
   shutting down the wind turbine;
   determining, via one or more sensors, an incoming wind direction of the wind turbine;
   transmitting a signal to position the wind turbine in a de-icing position by continuously yawing the nacelle of the wind turbine away from the incoming wind direction determined via the one or more sensors, to maintain the rotor in the down-wind location of the tower such that the rotor blade is positioned in the wake of the tower when the blade is at 6 o'clock position and pitching the rotor blade such that a leading edge of the rotor blade faces the tower; and, de-icing the rotor blade while the wind turbine is in the de-icing position.

2. The method of claim 1, further comprising rotating the rotatable hub so as to place the rotor blade in a substantially six o'clock position.

3. The method of claim 1, wherein pitching the rotor blade occurs after yawing the nacelle.

4. The method of claim 1, wherein pitching the rotor blade occurs before yawing the nacelle.

5. The of claim 1, wherein yawing the nacelle of the wind turbine further comprises rotating the nacelle about a yaw axis approximately 180 degrees from an initial location facing the wind.

6. The method of claim 1, wherein de-icing the rotor blade comprises at least one of circulating heated air within or across the rotor blade, heating the rotor blade via one or more heating elements, or spraying a de-icing liquid across the rotor blade.

7. The method of claim 1, further comprising monitoring, via the one or more sensors, an ice-related parameter of rotor blade, the ice-related parameter being indicative of ice being present on the rotor blade.

8. The method of claim 7, further comprising shutting down the wind turbine in response to the ice-related parameter indicating the presence of ice on the rotor blade.

9. A system for de-icing a rotor blade of a wind turbine, the wind turbine having a nacelle mounted atop a tower, the nacelle having a rotor with a rotatable hub having the rotor blade mounted thereto, the system comprising:
   one or more sensors configured to monitor at least one of an ice-related parameter of the rotor blade and an incoming wind direction of the wind turbine;
   at least one of a pitch drive mechanism or a yaw drive mechanism; and
   a controller communicatively coupled to the one or more sensors and the at least one of the pitch drive mechanism or the yaw drive mechanism, the controller being further configured to receive signals from the one or more sensors related to the ice-related parameter and implement a de-icing procedure in the event that the ice-related parameter indicates the presence of ice on the rotor blade, the de-icing procedure comprising:
   operating the wind turbine, wherein operation of the wind turbine generates a wake region extending from the tower to a down-wind location of the tower;
   determining the incoming wind direction of the wind turbine via the one or more sensors;
   shutting down the wind turbine in response to the ice-related parameter indicating the presence of ice on the rotor blade,
   transmitting a signal to position the wind turbine in a de-icing position by continuously yawing the nacelle of the wind turbine away from the incoming wind direction determined via the one or more sensors to maintain the rotor in the a-down-wind location of the tower such that the rotor blade is positioned in the wake of the tower when the bade is at 6 o'clock position and pitching the rotor blade such that a leading edge of the rotor blade faces the tower; and, de-icing the rotor blade while the wind turbine is in the de-icing position.

10. The system of claim 9, wherein the de-icing procedure further comprises rotating the rotatable hub so as to place the rotor blade in a substantially six o'clock position.

11. The system of claim 9, wherein de-icing the rotor blade comprises at least one of circulating heated air within or across the rotor blade, heating the rotor blade via one or more heating elements, or spraying a de-icing liquid across the rotor blade.

12. A method for de-icing a plurality of rotor blades of a wind turbine, the wind turbine having a nacelle mounted atop a tower, the nacelle having a rotor with a rotatable hub having the rotor blade mounted thereto, the method comprising:
   (a) operating, the wind turbine wherein operation of the wind turbine generates a wake region extending from the tower to a down-wind location of the tower;
   (b) shutting down the wind turbine;
   (C) determining, via one or more sensors, an incoming wind direction of the wind turbine;
   (d) rotating the rotatable hub so as to place one of the rotor blades in a six o'clock position;
   (e) transmitting a signal to continuously yaw the nacelle of the wind turbine to maintain the rotor in the a down-wind location of the tower based on the incoming wind direction determined via the one or more sensors such that the rotor blade is positioned in the wake of the tower when the blade is at 6 o'clock position:
   (f) pitching the rotor blade while yawing the nacelle such that a leading edge of the rotor blade faces the tower;
   (g) de-icing the rotor blade in the de-icing position; and
   (h) repeating steps (c) through (g) for each of the rotor blades.

13. The method of claim 12, wherein de-icing the rotor blade comprises at least one of circulating heated air within or across the rotor blade, heating the rotor blade via one or more heating elements, or spraying a de-icing liquid across the rotor blade.

14. The method of claim 12, further comprising monitoring, via the one or more sensors, an ice-related parameter of rotor blade, the ice-related parameter being indicative of ice being present on the rotor blade, and shutting down the wind turbine in response to the ice-related parameter indicating the presence of ice on the rotor blade.

* * * * *